United States Patent [19]

Furuhashi et al.

[11] Patent Number: 4,959,427

[45] Date of Patent: Sep. 25, 1990

[54] CATALYST COMPONENT FOR POLYMERIZATION OF OLEFINS

[75] Inventors: Hiroyuki Furuhashi; Tadashi Yamamoto; Masafumi Imai; Hiroshi Ueno, all of Saitama, Japan

[73] Assignee: Toa Nenryo Kogyo, K.K., Tokyo, Japan

[21] Appl. No.: 861,814

[22] Filed: May 12, 1986

Related U.S. Application Data

[62] Division of Ser. No. 761,240, Jul. 31, 1985, Pat. No. 4,613,579.

[30] Foreign Application Priority Data

Jul. 31, 1984 [JP] Japan .................................. 59-159118

[51] Int. Cl.$^5$ .................. C08F 4/654; C08F 10/00

[52] U.S. Cl. .................................. 526/142; 526/125; 526/143

[58] Field of Search ................. 526/142, 143

[56] References Cited

U.S. PATENT DOCUMENTS

| 4,115,319 | 9/1978 | Scatá et al. | 526/124 |
| 4,199,473 | 4/1980 | Timms | 526/142 |
| 4,252,670 | 2/1981 | Caunt et al. | 526/143 |
| 4,414,132 | 11/1983 | Goodall et al. | 526/125 |
| 4,473,660 | 9/1984 | Albizzati et al. | 826/125 |
| 4,549,001 | 10/1985 | Martin | 526/125 |

Primary Examiner—Edward J. Smith

[57] ABSTRACT

A catalyst component for the polymerization of olefins which is prepared by contacting a reaction product of dihydrocarbyl magnesium and a halogen-containing alcohol held in contact with a titanium compound.

2 Claims, No Drawings

CATALYST COMPONENT FOR POLYMERIZATION OF OLEFINS

This is a division of application Ser. No. 761,240, filed Jul. 13, 1985, now U.S. Pat. No. 4,613,579.

FIELD OF THE INVENTION

This invention relates to a catalyst component for the polymerization of olefins, to the catalyst system comprising the catalyst component, and to the process of polymerizing olefins, especially olefins having 3 or more carbon atoms, in the presence of the catalyst system.

BACKGROUND OF THE INVENTION

It is known that solid catalyst components having organic magnesium compounds, either directly or after having been subjected to an activating treatment, held in contact with transition metal compounds have been proposed for use in the polymerization of olefins. For example, solid catalyst components produced by using dialkyl magnesium as organic magnesium compounds, holding these dialkyl magnesium, either independently or in the form of complexes thereof with alkyl metals such as trialkyl aluminum, in contact with alcohols, and causing the resultant reaction products to be held in contact with titanium compounds have been proposed (specifications of Japanese Patent Application Laid-open SHO No. 53[1978]-87,990 and SHO-54[1979]-57,491).

These solid catalyst components, however, can hardly be called satisfactory in terms of catalytic activity. Particularly for the polymerization of alpha-olefins such as propylene, they fall short of being feasible because of inferior stereoregularity.

DISCLOSURE OF THE INVENTION

Object of the Invention

It is an object of this invention to provide a catalyst component which uses an organic magnesium compound as a starting material and which, in the polymerization of an olefin, exhibits high activity and high stereoregularity. It is a particular object of this invention to provide a catalyst component obtained by holding a reaction product of dihydrocarbyl magnesium and a halogen-containing alcohol in contact with a titanium compound. It is yet a further object of this invention to provide an olefin polymerization process which utilizes the catalyst component of this invention.

Summary of the Invention

To be specific, this invention essentially concerns a catalyst component for the polymerization of olefins which is prepared by contacting (i) a reaction product of dihydrocarbyl magnesium and a halogen-containing alcohol with (ii) a titanium compound.

Raw Materials for Preparation of Catalyst Component

(A) Dihydrocarbyl Magnesium

The dihydrocarbyl magnesium to be used in the present invention (hereinafter referred to as "organic Mg") is represented by the general formula, RMgR'. In this formula, R and R' denote an alkyl, cycloalkyl, aryl, or aralkyl group of 1 to 20 carbon atoms.

Examples of the organic Mg are dimethyl magnesium (hereinafter "magnesium" will be abbreviated "Mg"), diethyl Mg, ethylmethyl Mg, dipropyl Mg, diisopropyl Mg, ethylpropyl Mg, dibutyl Mg, diisobutyl Mg, di-sec-butyl Mg, di-tert-butyl Mg, butylethyl Mg, butylpropyl Mg, sec-butylethyl Mg, tert-butylisopropyl Mg, sec-butyl-tertbutyl Mg, dipentyl Mg, diisopentyl Mg, ethylpentyl Mg, isopropylpentyl Mg, sec-butylpentyl Mg, dihexyl Mg, ethylhexyl Mg, butylhexyl Mg, tert-butylhexyl Mg, (2-ethylbutyl)ethyl Mg, (2,2-diethylbutyl)ethyl Mg, diheptyl Mg, dioctyl Mg, di-2-ethylhexyl Mg, didecyl Mg, dicyclohexyl Mg, cyclohexylethyl Mg, butylcyclohexyl Mg, di(methylcyclohexyl) Mg, diphenyl Mg, ethylphenyl Mg, butylphenyl Mg, sec-butylphenyl Mg, ditolyl Mg, ethyltolyl Mg, dixylyl Mg, dibenzyl Mg, benzyl-tert-butyl Mg, diphenethyl Mg, and ethylphenethyl Mg.

The organic Mg may be a mixture or complex compound with an organic compound of other metal. The organic compound of other metal is represented by the general formula MRn (wherein M denotes boron, beryllium, aluminum, or zinc, R denotes an alkyl, cycloalkyl, aryl, or aralkyl group of 1 to 20 carbon atoms, and n denotes the valency of the metal M). Concrete examples of the organic compound of other metals are triethyl aluminum, tributyl aluminum, triisobutyl aluminum, triphenyl aluminum, triethyl boron, tributyl boron, diethyl beryllium, diisobutyl beryllium, diethyl zinc, and dibutyl zinc.

In the aforementioned mixture or complex compound, the ratio of the organic Mg to the organic compound of other metal generally is such that the amount of the other metal is not more than 2 gram atoms, preferably not more than 1 gram atom, per gram atom of magnesium.

(B) Halogen-containing Alcohol

The term "halogen-containing alcohol" as used in this invention means a monohydric or polyhydric alcohol possessing one or more hydroxyl groups in the molecule thereof and having one or more hydrogen atoms thereof other than the aforementioned hydroxyl group substituted with a halogen atom. Concrete examples of the halogen atom are chlorine, bromine, iodine, and fluorine atom. Among the halogen atoms cited above, the chlorine atom is particularly desirable.

Examples of the halogen-containing alcohol are 2-chloroethanol, 1-chloro-2-propanol, 3-chloro-1-propanol, 1-chloro-2-methyl-2-propanol, 4-chloro-1-butanol, 5-chloro-1-pentanol, 6-chloro-1-hexanol, 3-chloro-1,2-propane diol, 2-chlorocyclohexanol, 4-chlorobenzhydrol, (m,o,p)-chlorobenzyl alcohol, 4-chlorocatechol, 4-chloro(m,o)-cresol, 6-chloro-(m,o)-cresol, 4-chloro-3,5-dimethylphenol, chlorohydroquinone, 2-benzyl-4-chlorophenol, 4-chloro-1-naphthol, (m,o,p)-chlorophenol, p-chloro-alpha-methylbenzyl alcohol, 2-chloro-4-phenylphenol, 6-chlorothimol, 4-chlororesorcin, 2-bromoethanol, 3-bromo-1-propanol, 1-bromo-2-propanol, 1-bromo-2-butanol, 2-bromo-p-cresol, 1-bromo-2-naphthol, 6-bromo-2-naphthol, (m,o,p)-bromophenol, 4-bromoresorcin, (m,o,p)-fluorophenol, p-iodophenol: 2,2-dichloroethanol, 2,3-dichloro-1-propanol, 1,3-dichloro-2-propanol, 3-chloro-1-(alpha-chloromethyl)-1-propanol, 2,3-dibromo-1-propanol, 1,3-dibromo-mono-2-propanol, 2,4-dibromophenol, 2,4-dibromo-1-naphthol: 2,2,2-trichloroethanol, 1,1,1-trichloro-2-propanol, $\beta,\beta,\beta$-trichloro-tertbutanol, 2,3,4-trichlorophenol, 2,4,5-trichlorophenol, 2,4,6-trichlorophenol, 2,4,6-tribromophenol, 2,3,5-tribromo-2-hydroxy toluene, 2,3,5-tribromo-4-hydroxy toluene, 2,2,2-trifluoroethanol. alpha,alpha,alpha-trifluoro-m-cresol, 2,4,6-triiodophenol: 2,3,4,6-tetrachlorophenol, tetrachlorohydroquinone, tetrachloro-bis-phenol A, tetrabromo-bis-phenol A, 2,2,3,3-tetrafluoro-1-propanol, 2,3,5,6-tetrafluorophenol, and tetrafluororesorcin.

(C) Titanium Compound

Titanium compounds are divalent, trivalent, and tetravalent titanium compounds. Concrete examples of such titanium compounds are titanium tetrachloride, titanium tetrabromide, trichlorethoxy titanium, trichlorobutoxy titanium, dichlorodiethoxy titanium, dichlorodibutoxy titanium, dichlorodiphenoxy titanium, chlorotriethoxy titanium, chlorotributoxy titanium, tetrabutoxy titanium, and titanium trichloride. Among other titanium compounds enumerated above, such tetravalent titanium halides such as titanium tetrachloride, trichloroethoxy titanium, dichlorodibutoxy titanium, and dichlorodiphenoxy titanium prove desirable and titanium tetrachloride proves particularly desirable.

Method for Preparation of Catalyst Component

(1) Reaction of organic Mg and halogen-containing Alcohol

The reaction of organic Mg (A component) and the halogen-containing alcohol (B component) is effected by mechanically establishing contact between the two components by comminution or agitation in the presence or absence of an inactive medium.

Examples of the inactive medium usable in the contact are hydrocarbons such as pentane, hexane, heptane, octane, decane, cyclohexane, benzene, toluene, and xylene and halides of hydrocarbons such as 1,2-dichloroethane, 1,2-dichloropropane, carbon tetrachloride, butyl chloride, isoamyl chloride, bromobenzene, and chlorotoluene.

The contact of A component and B component is generally carried out at a temperature of $-20°$ C. to $+150°$ C. for a period of 0.1 to 100 hours. Where the contact entails evolution of heat, there may be adopted a procedure of first mixing the components gradually at a low temperature and, after all the components have been wholly mixed, elevating the temperature and continuing the contact. The proportions of the A component and the B component used in the contact is such that the B/A mol ratio will fall in the range of 0.1 to 20, preferably 1 to 10.

The reaction of the A component and the B component gives rise to a reaction product which is soluble or insoluble in the aforementioned medium. The soluble reaction product is directly put to use in the subsequent contact. The insoluble reaction product is subjected to this contact, optionally after it has been washed with the aforementioned medium.

In the present invention, the reaction product obtained as described above (hereinafter referred to as "reaction product I") is held in contact with the titanium compound. It may be held in contact with an electron-donating compound prior to the aforementioned contact with the titanium compound.

Examples of the electron-donating compound are carboxylic acids, carboxylic anhydrides, carboxylic esters, carboxylic halides, alcohols, ethers, ketones, amines, amides, nitriles, aldehydes, alcoholates, phosphorus, bismuth, and antimony compounds linked with organic groups through the medium of carbon or oxygen atom, phosphamides, thioethers, thioesters, and carbonic esters. Among other electron-donating compounds cited above, carboxylic acids, carboxylic anhydrides, carboxylic esters, carboxylic halides, alcohols, and ethers are particularly desirable.

Concrete examples of the carboxylic acids are aliphatic monocarboxylic acids such as formic acid, acetic acid, propionic acid, butyric acid, isobutyric acid, valeric acid, caproic acid, pivalic acid, acrylic acid, methacrylic acid, and crotonic acid, aliphatic dicarboxylic acids such as malonic acid, succinic acid, glutaric acid, adipic acid, sebacic acid, maleic acid, and fumaric acid, aliphatic oxycarboxylic acids such as tartaric acid, alicyclic carboxylic acids such as cyclohexane mono-carboxylic acids, cyclohexene monocarboxylic acids, cis-1,2-cyclohexane dicarboxylic acid, and cis-4-methylcyclohexane-1,2-dicarboxylic acids, aromatic monocarboxylic acids such as benzoic acid, toluic acid, anisic acid, p-tert-butyl-benzoic acid, naphtholic acid, and cinnamic acid, and aromatic polycarboxylic acids such as phthalic acid, isophthalic acid, terephthalic acid, naphthalic acid, trimellitic acid, hemimellitic acid, trimestic acid, pyromellitic acid, and mellitic acid.

Concrete examples of carboxylic anhydrides are anhydrides of the carboxylic acids enumerated above.

Carboxylic esters are monoesters and polyesters of the carboxylic acids enumerated above. Concrete examples of such monoesters and polyesters are butyl formate, ethyl acetate, butyl acetate, isobutyl isobutyrate, propyl pivalate, isobutyl pivalate, ethyl acrylate, methyl mechacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diisobutyl adipate, dibutyl sebacate, diisobutyl sebacate, diethyl maleate, dibutyl maleate, diisobutyl maleate, monomethyl fumarate, diethyl fumarate, diisobutyl fumarate, diethyl tartrate, dibutyl tartrate, diisobutyl tartrate, ethyl cyclohexane-carboxylates, methyl benzoate, ethyl benzoate, methyl p-toluate, ethyl p-tert butylbenzoate, ethyl p-anisate, ethyl alpha-naphthoate, isobutyl alpha-naphthoate, ethyl cinnamate, monomethyl phthalate, monobutyl phthalate, dibutyl phthalate, diisobutyl phthalate, dihexyl phthalate, dioctyl phthalate, di-2-ethylhexyl phthalate, diallyl phthalate, diphenyl phthalate, diethyl isophthalate, diisobutyl isophthalate, diethyl terephthalate, dibutyl terephthalate, diethyl naphthalate, dibutyl naphthalate, triethyl trimellate, tributyl trimellate, tetramethyl pyromellate, tetraethyl pyromellate, and tetrabutyl pyromellate.

Carboxylic halides are halides of the carboxylic acids enumerated above. Concrete examples of such halides are acetic acid chloride, acetic acid bromide, acetic acid iodide, propionic acid chloride, butyric acid chloride, butyric acid bromide, butyric acid iodide, pivalic acid chloride, pivalic acid bromide, acrylic acid chloride, acrylic acid bromide, acrylic acid iodide, methacrylic acid chloride, methacrylic acid bromide, methacrylic acid iodide, crotonic acid chloride, maloic acid chloride, maloic acid bromide, succinic acid chloride, succinic acid bromide, glutaric acid chloride, glutaric acid bromide, acipic acid chloride, adipic acid bromide, sebacic acid chloride, sebacic acid bromide, maleic acid chloride, maleic acid bromide, fumaric acid chloride, fumaric acid bromide, tartaric acid chloride, tartaric acid bromide, cyclohexane-carboxylic acid chloride, cyclohexane-carboxylic acid bromides, 1-cyclohexene-carboxylic acid chloride, cis-4-methylcyclohexene-carboxylic acid chloride, cis-4-methylcyclohexene-carboxylic acid bromide, benzoyl chloride, benzoyl bromide, p-toluic acid chloride, p-toluic acid bromide, p-anisic acid chloride, p-anisic acid bromide, alphanaphthoic acid chloride, cinnamic acid chloride, cinnamic acid bromide, phthalic acid dichloride, phthalic acid dibromide, isophthalic acid dichloride, isophthalic acid dibromide, terephthalic acid dichloride, and naphthalic acid dichloride. Further, monoalkylhalides of dicarboxylic acids such as adipic acid monomethyl chloride, maleic acid monoethyl chloride, maleic acid monoethyl chloride, and phthalic acid butyl chloride are also usable.

Alcohols are represented by the general formula, ROH. In the formula, R denotes an alkyl, alkenyl, cycloalkyl, aryl, or aralkyl group of 1 to 12 carbon atoms. Concrete examples of such alcohols are methanol, ethanol, propanol, isopropanol, butanol, isobutanol, pentanol, hexanol, octanol, 2-ethylhexanol, cyclohexanol, benzyl alcohol, allyl alcohol, phenol, resol, xylenol, ethyl phenol, isopropyl phenol, p-tertiary butyl phenol, and n-octyl phenol. Ethers are represented by the general formula ROR'. In the formula, R and R' each denote an alkyl, alkenyl, cycloalkyl, aryl, or aralkyl group of 1 to 12 carbon atoms, providing that R and R' may be equal to or different from each other. Concrete examples of such ethers are diethyl ether, diisopropyl ether, dibutyl ether, diisobutyl ether, diisoamyl ether, di-2-ethylhexyl ether, diallyl ether, ethylallyl ether, butylallyl ether, diphenyl ether, anisol, and ethylphenyl ether. Any of the compounds cited above as examples of halogen-containing alcohols are also usable.

The contact between the reaction product I and the electron-donating compound (C component) is effected by mechanically mixing the two components by comminution or agitation in the presence or absence of an inactive medium. The inactive medium to be used herein may be the same as the medium used in the contact between the A component and the B component mentioned above.

The contact by mechanical joint comminution is effected generally at a temperature in the range of 0° to 150° C. for 0.1 to 100 hours. The contact by stirring is effected generally at a temperature in the range of 0° to 150° C. for 0.5 to 10 hours. The C component is desired to be used in an amount falling in the range of 0.005 to 10 gram mols, preferably 0.01 to 1 gram mol, per gram atom of magnesium in the product I.

The reaction product obtained by the contact with the C component (hereinafter referred to as "reaction product II") is then held in contact with the titanium compound. Optionally, it may be washed with a suitable washing agent such as, for example, the aforementioned inactive medium prior to this contact.

(2) Contact with titanium compound

The contact of the reaction product I or the reaction product II and the titanium compound (D) component is effected by mechanically mixing the two components by comminution or agitation in the presence or absence of an inactive medium. Particularly, the mixing by agitation of the two components in the presence or absence of the inactive medium proves desirable. As the inactive medium, any of the aforementioned compounds can be used.

The proportions of the reaction product I or the reaction product II and the D component is such that the amount of the D component will exceed 0.1 gram mol, preferably fall in the range of 1 to 50 gram mols, per gram atom of magnesium in the reaction product I or the reaction product II. The contact of the two components by agitation in the presence of the inactive medium is carried out at a temperature in the range of 0° to 200° C. for 0.5 to 20 hours, preferably at 60° to 150° C. for one to five hours.

The contact of the reaction product I and the D component may be carried out in the presence of the electron-donating compound (C component). The C component is selected from the aforementioned group of compounds available for the contact with the reaction product I. The amount of the C component to be used herein may be the same as in the aforementioned contact of the reaction product I and the C component.

The contact between the reaction product II or the reaction product II and the D component may be carried out twice or more. This contact can be effected by any of the procedures mentioned above. In this case, the product from the former contact may be cleaned with an inactive medium and the cleaned product allowed to contact with a freshly added portion of E component (in conjunction with the aforementioned medium).

Where the contact with the D component is carried out in two or more split steps, the reaction mixture under treatment may be allowed to contact with an inactive hydrocarbon, halide of hydrocarbon, or metal halide compound between the split steps of contact. Examples of the inactive hydrocarbon usable for the contact are aliphatic, alicyclic, and aromatic hydrocarbons. Concrete examples of such hydrocarbons are n-hexane, methyl hexane, dimethyl hexane, ethyl hexane, ethylmethyl pentane, n-heptane, methyl heptane, trimethyl pentane, dimethyl heptane, ethyl heptane, trimethyl hexane, trimethyl heptane, n-octane, methyl octane, dimethyl octane, n-undecane, n-dodecane, n-tridecane, n-tetradecane, n-pentadecane, n-hexadecane, n-octadecane, n-nonadecane, n-eicosane, cyclopentane, cyclohexane, methyl cyclopentane, cycloheptane, dimethylcyclopentane, methyl cyclohexane, ethyl cyclopentane, dimethyl cyclohexane, ethyl cyclohexane, cyclooctane, indane, n-butyl cyclohexane, isobutyl cyclohexane, adamantane, benzene, toluene, xylene, ethylbenzene, tetramethylbenzene, n-butylbenzene, isobutylbenzene, propyl toluene, decalin, and tetralin Examples of the halide of hydrocarbon usable for the contact are mono- and poly-halogen substitution products of saturated or unsaturated aliphatic, alicyclic and aromatic hydrocarbons. Concrete examples of such compounds are aliphatic compounds such as methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, ethyl iodide, 1,2-dichloroethane, 1,2-dibromoethane, 1,2-diiodo-ethane, methyl chloroform, methyl bromoform, methyl iodoform, 1,1,2-trichloro-ethylene, 1,1,2-tribromo-ethylene, 1,1,2,2-tetrachloro-ethylene, pentachloro-ethane, hexachloro-ethane, hexabromo-ethane, n-propyl chloride, 1,2-dichloropropane, hexachloropropylene, octachloro-propane, decabromo-butane, and chlorinated paraffins, alicyclic compounds such as chlorocyclo-propane, tetrachlorocyclo-pentane, hexachloro-pentane, and hexachloro-cyclohexane, and aromatic compounds such as chlorobenzene, bromobenzene, o-dichlorobenzene, p-dichlorobenzene, hexachlorobenzene, hexabromobenzene, benzotrichloride, and p-chlorobenzo-trichloride.

These compounds are such that one member of a mixture of two or more members selected from the compounds enumerated above may be advantageously used.

The metal halide compound is the halide of one element selected from the class of elements of Group IIIa, Group IVa, and Group Va in the Periodic Table of Elements (hereinafter referred to as "metal halide"). Examples of the metal halide are chlorides, fluorides, bromides, and iodides of B, Al, Ga, In, Tl, Si, Ge, Sn, Pb, As, Sb, and Bi. Among other metal halides enumerated above, $BCl_3$, $BBr_3$, $BI_3$, $AlCl_3$, $AlBr_3$, $AlI_3$, $GaCl_3$, $GaBr_3$, $InCl_3$, $TlCl_3$, $SiCl_4$, $SnCl_4$, $SbCl_5$, and $SbF_5$ prove particularly desirable.

The contact of the reaction mixture optionally made with the inactive hydrocarbon, halide of hydrocarbon, or metal halide (hereinafter referred to as "E component") between the two or more split steps of contact made by the D component is carried out at a temperature in the range of 0° to 200° C. for a period of 5 minutes to 20 hours, preferably at 20° C. to 150° C. for 10 minutes to 5 hours. When the E component is a liquid substance, it is desired to be used in such an amount that the reaction product I is obtained in an amount in the range of 1 to 1,000 g per liter of the E component. When the E component is a solid substance, this solid E component is desired to be used as dissolved in another E component capable of dissolving the solid E component. The amount of this solid E component is desired to be such that the reaction product I or the reaction product II is obtained in an amount in the range of 0.01 to 100 g per g of the E component.

The mass of contact between the reaction product I with the D component may be allowed to contact with the C component. This contact can be carried out in the same manner as in the contact optionally made by the use of the aforementioned C component. Further, the reaction product obtained as described above may be held in contact with the E component when necessary. This contact may be made in the same way as the aforementioned contact with the E component.

The reaction product obtained as described above is cleaned, when necessary, with hydrocarbons such as hexane, heptane, octane, cyclohexane, benzene, toluene, or xylene, and then dried to give birth to the catalyst component of the present invention.

The catalyst component of the present invention is formed of particles having a specific surface area in the range of 10 to 1000 $m^3/g$ and a pore volume in the range of 0.05 to 5 $cm^3/g$ as measured by the BET method at the adsorption temperature of liquefied nitrogen and possessing diameters so uniform as to be distributed in a narrow range. As to percentage composition, this catalyst component comprises 10 to 25% by weight of magnesium atom, 0.5 to 10% by weight of titanium atom, 40 to 60% by weight of halogen atom, and contains organic compound. When the electron-donating compound is used during the preparation of the catalyst component, this compound is generally contained therein.

Catalyst for the Polymerization of Olefins

The catalyst component of the present invention is used, as combined with an organic compound of a metal selected from the class of metals belonging to Groups I through III in the Periodic Table of Elements, for catalyzing the homopolymerization of an olefin or the copolymerization of the olefin with other olefins.

Organic Compound of Metal of Group I through Group III

Examples of the organic metal compounds usable in combination with the catalyst component are organic compounds of lithium, magnesium, calcium, zinc, and aluminum. Among other organic metal compounds just mentioned, organic aluminum compounds prove particularly desirable. The organic aluminum compounds usable herein are represented by the general formula $R_nAlX_{3-n}$ (wherein R denotes an alkyl group or an aryl group, X denotes a halogen atom, an alkoxy group or a hydrogen atom, and n denotes a desired number in the range of $1 \leq n \leq 3$). Particularly desirable examples of the organic aluminum compounds are alkyl aluminum compounds such as trialkyl aluminum, dialkyl aluminum monohalide, monoalkyl aluminum dihalide, alkyl aluminum sesquihalide, dialkyl aluminum monoalkoxide, and dialkyl aluminum monohydride. respectively having 1 to 18 carbon atoms, preferably 2 to 6 carbon atoms, and mixtures and complex compounds thereof. Concrete examples of such organic aluminum compounds are trialkyl aluminums such as trimethyl aluminum, triethyl aluminum, tripropyl aluminum, triisobutyl aluminum, and trihexyl aluminum, dialkyl aluminum monohalides such as dimethyl aluminum chloride, diethyl aluminum chloride, diethyl aluminum bromide, diethyl aluminum iodide, and diisobutyl aluminum chloride, monoalkyl aluminum dihalides such as methyl aluminum dichloride, ethyl aluminum dichloride, methyl aluminum dibromide, ethyl aluminum dibromide, ethyl aluminum diiodide, and isobutyl aluminum dichloride, alkyl aluminum sesquihalides such as ethyl aluminum sesquichloride, dialkyl aluminum monoalkoxides such as dimethyl aluminum methoxide, diethyl aluminum ethoxide, diethyl aluminum phenoxide, dipropyl aluminum ethoxide, diisobutyl aluminum ethoxide, and diisobutyl aluminum phenoxide, and dialkyl aluminum hydrides such as dimethyl aluminum hydride, diethyl aluminum hydride, dipropyl aluminum hydride, and diisobutyl aluminum hydride. Among other organic aluminum compounds enumerated above, trialkyl aluminums, specifically triethyl aluminum, triisobutyl aluminum, prove particularly desirable. The trialkyl aluminum can be used in combination with other organic aluminum compounds such as diethyl aluminum chloride, ethyl aluminum dichloride, ethyl aluminum sesouichloride, diethyl aluminum ethoxide, or diethyl aluminum hydride which is easily available commercially. These other organic aluminum compounds may be used in the form of a mixture or complex compound.

Further, an organic aluminum compound having two or more aluminum atoms linked through the medium of an oxygen atom or nitrogen atom is also usable. Concrete examples of this organic aluminum compound are $(C_2H_5)_2AlOAl(C_2H_5)_2$, $(C_4H_9)_2AlOAl(C_4H_9)_2$, and

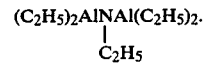

Examples of organic compounds of metals other than aluminum are diethyl magnesium, ethyl magnesium chloride, diethyl zinc and such compounds as $LiAl(C_2H_5)_4$ and $LiAl(C_7H_{15})_4$.

The organic metal compound may be used independently or in combination with an electron-donating compound. This electrondonating compound may be any of the electron-donating compounds which are optionally used in the preparation of the catalyst component described above. Besides, organic silicon compounds capable of serving as electron-donating compounds and electron-donating compounds containing hetero atoms such as nitrogen, sulfur, oxygen, and phosphorus atoms are also usable.

Concrete examples of organic silicon compounds are tetramethoxy silane, tetraethoxy silane, tetrabutoxy silane, tetraisobutoxy silane, tetraphenoxy silane, tetra(p-methylphenoxy) silane, tetrabenzyloxy silane, methyl trimethoxy silane, methyl triethoxy silane, methyl tributoxy silane, methyl triphenoxy silane, ethyl triethoxy silane, ethyl triisobutoxy silane, ethyl triphenoxy silane, butyl trimethoxy silane, butyl triethoxy silane, butyl triphenoxy silane, isobutyl triisobutoxy silane, vinyl triethoxy silane, allyl trimethoxy silane, phenyl trimethoxy silane, phenyl triethoxy silane, benzyl triphenoxy silane, methyl triallyloxy silane, dimethyl dimethoxy silane, dimethyl diethoxy silane, dimethyl diisopropoxy silane, dimethyl dibutoxy silane, dimethyl dihexyloxy silane, dimethyl diphenoxy silane, diethyl diethoxy silane, diethyl diisobutoxy silane, diethyl diphenoxy silane, dibutyl diisopropoxy silane, dibutyl dibutoxy silane, dibutyl diphenoxy silane, diisobutyl diethoxy silane, diisobutyl diisobutoxy silane, diphenyl dimethoxy silane, diphenyl diethoxy silane, diphenyl dibutoxy silane, dibenzyl diethoxy silane, divinyl diphenoxy silane, diallyl dipropoxy silane, diphenyl diallyloxy silane, methylphenyl dimethoxy silane, and chlorophenyl diethoxy silane.

Concrete examples of the electron-donating compound containing a hetero atom are such nitrogen atom-containing compounds as 2,2,6,6-tetramethyl piperidine, 2,6-dimethyl piperidine, 2,6-diethyl piperidine, 2,6-diisopropyl piperidine, 2,2,5,5-tetramethyl pyrrolidine, 2,5-dimethyl pyrrolidine, 2,5-diethyl pyrrolidine, 2,5-diisopropyl pyrrolidine, 2-methyl pyridine, 3-methyl pyridine, 4-methyl pyridine, 1,2,4-trimethyl piperidine, 2,5-dimethyl piperidine, methyl nicotinate, ethyl nicotinate, nicotinic acid amide, benzoic acid amide, 2-methyl pyrrole, 2,5-dimethyl pyrrole, imidazole, toluic acid amide, benzonitrile, acetonitrile, aniline, paratoluidine, ortho-toluidine, meta-toluidine, triethyl amine, diethyl amine, dibutyl amine, tetramethylene diamine, and tributyl amine, such sulfur atom-containing compounds as thiophenol, thiophene, ethyl 2-thiophene carboxylate, ethyl 3-thiophene carboxylate, 2-methyl thiophene, methyl mercaptan, ethyl mercaptan, isopropyl mercaptan, butyl mercaptan, diethyl thioether, methyl benzenesulfonate, methyl sulfite, and ethyl sulfite, such oxygen atom-containing compounds as tetrahydrofuran, 2-methyl tetrahydrofuran, 3-methyl tetrahydrofuran, dioxane, dimethyl ether, diethyl ether, dibutyl ether, diisoamyl ether, diphenyl ether, anisole, acetophenone, acetone, methylethyl ketone, acetyl acetone, ethyl 2-furalate, isoamyl 2-furalate, methyl 2-furalate, and propyl 2-furalate, and such phosphorus atom-containing compounds as triphenyl phosphine, tributyl phosphine, triphenyl phosphite, tribenzyl phosphite, diethyl phosphate, and diphenyl phosphate.

These electron-donating compounds are such that two or more members selected from the group of compounds enumerated above can be used as a mixture. The electron-donating compound may be used at the same time that the organic metal compound is used in combination with the catalyst component or it may be used after it has been placed in contact with the organic metal compound.

The amount of the organic metal compound to be used relative to the catalyst component of the present invention falls generally in the range of 1 to 2000 gram mols, preferably 20 ti 500 gram mols, per gram atom of titanium present in the catalyst component.

The proportions of the organic metal compound and the electron-donating compound are such that the amount of the organic metal compound falls in the range of 0.1 to 40 gram atoms, preferably 1 to 25 gram atoms, per mol of the electron-donating compound.

Polymerization of Olefins

The catalyst which comprises the catalyst component obtained as described above and the organic metal compound (and the electron-donating compound) is useful for catalyzing homopolymerization of a monoolefin or copolymerization of the monoolefin in combination with other monoolefins or diolefins. The catalyst exhibits an outstanding function, particularly in catalyzing homopolymerization of an alpha-olefin such as, for example, propylene, 1-butene, 4-methyl-1-pentene, or 1-hexene, copolymerization of two such alpha-olefins and/or random and block copolymerization of ethylene and an alpha-olefin of 3 to 10 carbon atoms such as, for example, propylene, 1-butene, 4-methyl-1-pentene, 1-hexene, or 1-octene.

The polymerization may be carried out in either the gaseous phase or the liquid phase. When the polymerization is performed in the liquid phase, it can be effected on a liquid monomer in an inactive hydrocarbon such as normal butane, iso-butane, normal pentane, iso-pentane, hexane, heptane, octane, cyclohexane, benzene, toluene, or xylene. The polymerization temperature falls generally in the range of $-80°$ C. to $+150°$ C., preferably in the range of 40° C. to 120° C. The polymerization pressure is sufficient in the range of 1 to 60 atmospheres. Adjustment of the molecular weight of the polymer to be obtained is attained by causing the polymerization to proceed in the presence of hydrogen or other known molecular weight adjusting agents. The amount of the other olefin with which the olefin is copolymerized generally is not allowed to exceed 30% by weight and preferably is selected in the range of 0.3 to 15% by weight. The polymerization by the catalyst system of this invention can be carried out continuously or batchwise under those conditions which are generally adopted for the purpose of polymerization. The copolymerization may be performed in one step or in two or more split steps.

Effect of the Invention

The catalyst component of the present invention functions effectively as a catalyst for the production of a polyolefin, particularly isotactic polypropylene, a random copolymer of ethylene and propylene, and a block copolymer of ethylene and propylene.

The polymerization catalyst using the catalyst component of the present invention possesses high polymerization activity and high stereoregularity and permits the high polymerization activity to be retained long during the course of the polymerization. The olefin polymer powder consequently obtained has high bulk density. The polymer powder abounds with fluidity.

EXAMPLE

Now, the present invention will be described more specifically below with reference to the examples and applied examples. This invention is not limited to the working examples. The percents (%) mentioned in the examples and applied examples are percents by weight unless otherwise specified.

The heptane insolubles content (hereinafter referred to as "HI") which shows the proportion of crystalline polymer to the whole of a given polymer represents the residue after 6 hours' extraction of the polymer with boiling n-heptane in an improved version of Soxhlet extracter. The melt flow rate (MFR) and the melt index (MI) represent the values determined in accordance with ASTM D-1238. The bulk density represents the value determined by the method A defined in ASTM D-1895-69.

EXAMPLE 1

Contact of n-butylethyl magnesium with 2,2,2-trichloroethanol

A flask having an inner volume of 300 ml and provided with a dropping funnel and a stirrer had its interior air displaced with nitrogen gas. In the flask, 8 g (53.5 mmols) of 2,2,2-trichloroethanol and 100 ml of n-heptane were placed. Then a mixed solution consisting of 20 ml of a 20% n-heptane solution of n-butylethyl magnesium (hereinafter referred to as "BEM") (the solution being a product of Texas Alkyls Corp., marketed under the trademark designation of "MAGALA ® BEM") (26.8 mmols as BEM) and 20 ml of n-heptane was added dropwise through the dropping funnel, while under agitation, at 0° C. over a period of one hour. The contents of the flask were stirred at 0° C. for two hours, heated to 80° C. over a period of two hours, and stirred for reaction at 80° C. for two hours. After completion of the reaction, the reaction mixture was washed five times with 100 ml of n-hexane at 60° C. and dried under a vacuum. Consequently, there was obtained 8.5 g of a white solid substance (solid component I). The solid component I, by analysis, was found to contain 7.6% of magnesium and 65.8% of chlorine. It was found to have a specific surface are of 126 m$^2$/g a pore volumn of 0.37 cm$^3$/g.

Contact with di-n-butyl phthalate and titanium tetrachloride

The solid component I obtained in the preceding procedure and 35 ml of toluene and 0.8 g of di-n-butyl phthalate added thereto were heated for reaction at 90° C. for two hours. Then, the reaction mixture and 50 ml of titanium tetrachloride added thereto were heated for reaction at 90° C. for two hours. The solid substance obtained by this reaction was washed at room temperature eight times with 100 ml of n-hexane. It was then dried under a vacuum at room temperature for one hour. Consequently, 4.3 g of a catalyst component was obtained. This catalyst component was found to have a specific surface area of 209 m$^2$/g and a pore volume of 0.16 cm$^3$/g. This catalyst component was found to contain 15.4% of magnesium, 51.6% of chlorine, 2.7% of titanium, and 14.8% of di-n-butyl phthalate.

EXAMPLE 2

The solid substance formed after contact with titanium tetrachloride in the procedure of Example 1 was separated. This solid substance and 50 ml of titanium tetrachloride added thereto were heated for reaction at 90° C. for two hours. The solid substance consequently formed was treated in the same way as in Example 1 to afford a catalyst component having a titanium content of 2.8%.

EXAMPLE 3

The reaction mixture formed after contact with titanium tetrachloride in the procedure of Example 1 was decanted to expel the supernatant. The solid substance which remained was cleaned in 85 ml of toluene at 90° C. for 15 minutes. The washing treatment with toluene was repeated. The washed solid substance and 35 ml of toluene and 50 ml of titanium tetrachloride added thereto were heated for reaction at 90° C. for two hours. The resultant reaction mixture was washed with n-hexane and dried in the same way as in Example 1, to afford 4.4 g of a catalyst component. This catalyst component was found to have a specific surface area of 203 m$^2$/g and a pore volume of 0.17 m$^3$/g. It was found to contain 15.2% of magnesium, 50.3% of chlorine, 2.6% of titanium, and 14.7% of di-n-butyl phthalate.

EXAMPLE 4

The procedure for Example 3 was repeated, except that the temperature of contact with titanium tetrachloride was changed from 90° C. to 120° C. Consequently, there was prepared a catalyst component having a titanium content of 1.9%.

EXAMPLE 5

The procedure of Example 3 was repeated, except that in the contact of di-n-butyl phthalate and titanium tetrachloride, these two compounds were added at the same time for reaction. Consequently, there was prepared a catalyst component having a titanium content of 2.6%.

EXAMPLE 6

The procedure of Example 3 was repeated, except that in the contact of di-n-butyl phthalate and titanium tetrachloride, titanium chloride was added and abruptly heated to 90° C. for two hours. Consequently, there was prepared a catalyst component having a titanium content of 2.8%.

EXAMPLE 7

The white solid substance (solid component I) obtained in the procedure of Example 1 and 85 ml of titanium tetrachloride added thereto were stirred and heated suddenly to 90° C. The resultant mixture and 0.8 g of di-n-butyl phthalate added thereto were heated for reaction at 90° C. for two hours. After completion of the reaction, the supernatant was removed and the residue and 85 ml of titanium tetrachloride added thereto were heated for reaction at 90° C. for two hours. The resultant reaction mixture was washed and dried by following the procedure of Example 1, to afford a catalyst component having a titanium content of 3.1%.

EXAMPLE 8

In the procedure of Example 7, between the two split steps of contact with titanium tetrachloride, the reaction mixture was washed twice with 85 ml of titanium tetrachloride at 90° C. for 15 minutes. The reaction mixture was washed and dried by following the procedure of Example 1. Consequently, there was prepared a catalyst component having a titanium content of 3.0%.

EXAMPLES 9–11

The procedure of Example 3 was followed, except that in the contact of di-n-butyl phthalate and titanium tetrachloride, xylene (Example 9), n-heptane (Example 10), and 1,2-dichloroethane (Example 11) were severally used as an inactive medium in the place of toluene. Consequently there were prepared catalyst components having titanium contents of 2.6% (Example 9), 2.9% (Example 10), and 2.5% (Example 11).

EXAMPLES 12–14

During the course of contact with di-n-butyl phthalate and titanium tetrachloride in the procedure of Example 3, the reaction mixture resulting from the first step of contact with titanium tetrachloride was freed of the supernatant. The residue and 85 ml of toluene and 3 g of silicon tetrachloride (Example 12), 3 g of aluminum trichloride (Example 13), or 3 g of hexachloroethane (Example 14) added thereto were heated for reaction at 60° C. for one hour. The resultant reaction mixture was washed four times with 85 ml of toluene at 60° C. The washed reaction mixture was mixed with 35 ml of toluene and 50 ml of titanium tetrachloride to undergo the second reaction with titanium tetrachloride. The reaction mixture consequently obtained was washed and dried in the same way as in Example 1. Consequently, there were produced catalyst components having titanium contents of 2.3% (Example 12), 2.4% (Example 13), and 2.1% (Example 14) respectively.

EXAMPLES 15 AND 16

A solid substance was obtained by effecting the reaction of the solid substance I with titanium tetrachloride and di-n-butyl phthalate in the same way as in Example 3. This solid substance was washed eight times with n-hexane similarly to Example 1. The washed solid substance was held in contact with 3.2 g of hexachloroethane and 150 ml of toluene (Example 15) or 150 ml of 1,2-dichloroethane (Example 16) at 50° C. for 30 minutes. The solid substance consequently obtained was separated by filtration at 50° C., washed with 100 ml of n-hexane at room temperature, dried under a vacuum for one hour. Consequently, there were prepared catalyst components having titanium contents of 1.9% (Example 15) and 1.6% (Example 16).

EXAMPLES 17–19

Catalyst components having titanium contents shown below were prepared by following the procedure of Example 3, except that varying organic Mg indicated below were used in the place of BEM.

TABLE I

| Example | Organic Mg | Titanium Content (%) |
|---|---|---|
| 17 | Di-n-hexyl magnesium (product of Texas Alkyls Corp., marketed under trademark designation MAGALA ® DNHM) | 2.8 |
| 18 | Di-n-butyl magnesium (0.5 mol)-triethyl aluminum (1 mol) complex (product of Texas Alkyls Corp., marketed under trademark designation of MAGALA ® 0.5E) | 2.7 |
| 19 | Di-n-butyl magnesium (7.5 mols)-triethyl aluminum (1 mol) complex (product of Texas Alkyls Corp, marketed under trademark designation of MAGALA ® 7.5E) | 2.7 |

TABLE I-continued

| Example | Organic Mg | Titanium Content (%) |
|---|---|---|

EXAMPLES 20–38

Catalysy components having titanium contents indicated below were prepared by following the procedure of Example 3, except were prepared by following the procedure of Example 3, except that varying halogen-containing alcohols indicated below were used in the place of 2,2,2-trichloroethanol.

TABLE III

| Example | Halogen-Containing Alcohol | Titanium Content (%) |
|---|---|---|
| 20 | 1,1,1-Trichloro-2-propanol | 2.5 |
| 21 | β,β,β-Trichloro-tert-butanol | 2.7 |
| 22 | 2,2-Dichloroethanol | 2.8 |
| 23 | 1,3-Dichloro-2-propanol | 2.6 |
| 24 | 2-Chloroethanol | 2.9 |
| 25 | 4-Chloro-1-butanol | 2.9 |
| 26 | 6-Chloro-1-hexanol | 3.1 |
| 27 | p-Chlorophenol | 2.5 |
| 28 | 4-Chloro-o-cresol | 2.4 |
| 29 | 2,4,6-Trichlorophenol | 2.4 |
| 30 | Tetrachlorohydroquinone | 2.6 |
| 31 | 1-Bromo-2-butanol | 2.5 |
| 32 | 1,3-Dibromo-2-propanol | 2.7 |
| 33 | p-Bromophenol | 3.0 |
| 34 | 2,4,6-Tribromophenol | 2.8 |
| 35 | p-Iodophenol | 2.4 |
| 36 | 2,4,6-Triiodophenol | 2.6 |
| 37 | 2,2,2-Trifluoroethanol | 2.3 |
| 38 | p-Fluorophenol | 2.5 |

EXAMPLES 39–63

Catalyst components having titanium contents shown below were obtained by following the procedure of Example 3, except that varying electron-donating compounds indicated below were used in an equal mol in the place of di-n-butyl phthalate during the contact with the solid component I.

TABLE IV

| Example | Electron-Donating Compound | Titanium Content (%) |
|---|---|---|
| 39 | Ethyl benzoate | 3.0 |
| 40 | Diisobutyl phthalate | 2.7 |
| 41 | Phthalic anhydride | 3.3 |
| 42 | Phthalic acid dichloride | 3.7 |
| 43 | Phthalic acid n-butyl chloride | 3.1 |
| 44 | Mono-n-butyl phthalate | 3.4 |
| 45 | Benzoic anhydride | 3.0 |
| 46 | Benzoyl chloride | 3.8 |
| 47 | Ethyl cinnamate | 2.7 |
| 48 | Ethyl cyclohexane carboxylate | 2.8 |
| 49 | Tartaric acid | 3.2 |
| 50 | Di-n-butyl tartrate | 3.1 |
| 51 | Isobutyl methacrylate | 2.8 |
| 52 | Phthalic acid | 3.4 |
| 53 | Benzoic acid | 3.6 |
| 54 | Di-n-butyl maleate | 3.1 |
| 55 | Diisobutyl sebacate | 2.8 |
| 56 | Tri-n-butyl trimellitate | 2.9 |
| 57 | Ethanol | 3.0 |
| 58 | Isobutanol | 3.1 |
| 59 | 2-Ethylhexanol | 2.8 |
| 60 | p-Cresol | 2.9 |
| 61 | Diethyl ether | 3.4 |
| 62 | Di-n-butyl ether | 3.2 |

TABLE IV-continued

| Example | Electron-Donating Compound | Titanium Content (%) |
|---------|---------------------------|----------------------|
| 63 | Diphenyl ether | 3.0 |

EXAMPLE 64

In a mill pot, 16.0 g of the same white solid substance (solid component I) as prepared by the procedure of Example 1 and 4.0 g of di-n-butyl phthalate were subjected to a comminuting treatment under a blanket of nitrogen gas for 15 hours.

The crushed solid substance consequently obtained was held in contact with titanium tetrachloride in the same way as in Example 3, to afford a catalyst component having a titanium content of 3.6%.

EXAMPLE 65

By following the procedure of Example 3, except omitting use of di-n-butyl phthalate, there was obtained a catalyst component having a titanium content of 5.2%.

COMPARATIVE EXAMPLE 1

By following the procedure of Example 3, except substituting 2,2,2-trichloroethanol with ethanol of an equal mol, there was obtained a catalyst component having a titanium content of 3.0%.

COMPARATIVE EXAMPLE 2

By following the procedure of Example 65, except substituting 2,2,2-trichloroethanol with ethanol of an equal mol, there was obtained a catalyst component having a titanium content of 5.0%.

APPLIED EXAMPLE 1

In a stainless steel autoclave having an inner volume of 1.5 liters and provided with a stirrer, a reaction mixture obtained by mixing 15.0 mg of the catalyst component prepared by the procedure of Example 1, 0.85 ml of an n-heptane solution of triethyl aluminum (1 mol/liter) and allowing the resultant mixture to stand for five minutes was placed under a blanket of nitrogen gas. Then, 0.1 liter of hydrogen gas as a molecular weight regulator and 1 liter of liquefied propylene were introduced therein under pressure. The reaction system was heated to 70° C. to effect polymerization of propylene for one hour. After completion of the polymerization, the unaltered propylene was purged to produce 175 g of white polypropylene powder having 97.0% of HI, 5.4 of MFR, and 0.37 g/cm$^3$ of bulk density (Kc [amount of produced polymer in g per g of catalyst component]=11,700 and Kt [amount of produced polymer in kg per g of titanium in catalyst component]=432).

The polypropylene powder so obtained was tested for particle diameter distribution. The results are shown below.

| Particle diameter (μm) | Proportion of distribution (%) |
|------------------------|-------------------------------|
| Less than 74 | 0 |
| 74–149 | 2.5 |
| 149–250 | 11.7 |
| 250–350 | 15.9 |
| 350–420 | 15.6 |
| 420–590 | 28.1 |
| 590–840 | 16.2 |
| 840–1,000 | 4.5 |
| 1,000–1,680 | 5.5 |
| Exceeding 1,680 | 0 |

APPLIED EXAMPLES 2–65

Polymerization of propylene as carried out by following the procedure of Applied Example 1, except that the catalyst components obtained in Examples 2–65 and Comparative Experiment 1 were severally used. The results are shown in the following table.

TABLE VI

| Applied Example | Catalyst Component | Kc (g/g Cat) | Kt (kg/g Ti) | HI (%) | MFR (g/10 min) | Bulk Density (g/cm$^3$) |
|---|---|---|---|---|---|---|
| 2 | Example 2 | 14,300 | 510 | 97.5 | 4.3 | 0.37 |
| 3 | Example 3 | 16,500 | 635 | 98.2 | 4.6 | 0.38 |
| 4 | Example 4 | 19,100 | 1,005 | 98.4 | 3.8 | 0.39 |
| 5 | Example 5 | 16,200 | 623 | 98.1 | 5.1 | 0.38 |
| 6 | Example 6 | 15,900 | 568 | 98.2 | 4.5 | 0.37 |
| 7 | Example 7 | 13,300 | 429 | 97.2 | 6.2 | 0.37 |
| 8 | Example 8 | 14,600 | 487 | 97.7 | 5.9 | 0.37 |
| 9 | Example 9 | 15,300 | 588 | 98.0 | 4.8 | 0.38 |
| 10 | Example 10 | 14,900 | 514 | 97.9 | 6.9 | 0.37 |
| 11 | Example 11 | 15,500 | 620 | 98.1 | 5.6 | 0.38 |
| 12 | Example 12 | 14,300 | 622 | 97.9 | 4.8 | 0.36 |
| 13 | Example 13 | 15,000 | 625 | 97.8 | 5.7 | 0.37 |
| 14 | Example 14 | 16,300 | 776 | 98.1 | 6.6 | 0.38 |
| 15 | Example 15 | 18,400 | 968 | 98.2 | 7.3 | 0.39 |
| 16 | Example 16 | 17,200 | 1,075 | 98.3 | 6.7 | 0.39 |
| 17 | Example 17 | 16,400 | 586 | 98.1 | 4.7 | 0.38 |
| 18 | Example 18 | 15,500 | 574 | 97.8 | 5.8 | 0.37 |
| 19 | Example 19 | 14,900 | 552 | 97.7 | 7.1 | 0.37 |
| 20 | Example 20 | 15,800 | 632 | 98.2 | 4.7 | 0.38 |
| 21 | Example 21 | 16,900 | 626 | 98.1 | 3.8 | 0.39 |
| 22 | Example 22 | 14,600 | 521 | 97.5 | 5.6 | 0.37 |
| 23 | Example 23 | 15,100 | 581 | 97.9 | 5.3 | 0.38 |
| 24 | Example 24 | 13,700 | 472 | 97.6 | 6.2 | 0.37 |
| 25 | Example 25 | 13,900 | 479 | 97.5 | 6.7 | 0.37 |
| 26 | Example 26 | 12,500 | 403 | 97.5 | 5.5 | 0.36 |
| 27 | Example 27 | 13,200 | 528 | 97.8 | 4.9 | 0.38 |
| 28 | Example 28 | 14,100 | 588 | 97.7 | 4.5 | 0.38 |
| 29 | Example 29 | 15,000 | 625 | 98.0 | 7.1 | 0.37 |
| 30 | Example 30 | 11,900 | 458 | 97.4 | 6.6 | 0.35 |
| 31 | Example 31 | 10,700 | 428 | 97.0 | 5.4 | 0.34 |

TABLE VI-continued

| Applied Example | Catalyst Component | Kc (g/g Cat) | Kt (kg/g Ti) | HI (%) | MFR (g/10 min) | Bulk Density (g/cm³) |
|---|---|---|---|---|---|---|
| 32 | Example 32 | 11,500 | 426 | 96.9 | 4.1 | 0.36 |
| 33 | Example 33 | 12,600 | 420 | 96.7 | 7.8 | 0.35 |
| 34 | Example 34 | 9,200 | 329 | 96.3 | 6.3 | 0.34 |
| 35 | Example 35 | 12,200 | 508 | 96.9 | 4.9 | 0.36 |
| 36 | Example 36 | 12,700 | 488 | 97.0 | 5.6 | 0.36 |
| 37 | Example 37 | 14,100 | 613 | 96.8 | 6.7 | 0.37 |
| 38 | Example 38 | 13,500 | 540 | 97.0 | 7.4 | 0.37 |
| 39 | Example 39 | 12,300 | 410 | 97.1 | 5.2 | 0.37 |
| 40 | Example 40 | 15,300 | 567 | 98.0 | 4.8 | 0.39 |
| 41 | Example 41 | 13,100 | 397 | 97.6 | 4.5 | 0.37 |
| 42 | Example 42 | 14,800 | 400 | 97.8 | 5.4 | 0.38 |
| 43 | Example 43 | 14,100 | 455 | 97.5 | 5.2 | 0.35 |
| 44 | Example 44 | 14,500 | 426 | 97.5 | 5.5 | 0.37 |
| 45 | Example 45 | 12,800 | 427 | 97.3 | 6.1 | 0.36 |
| 46 | Example 46 | 12,500 | 392 | 97.4 | 5.0 | 0.36 |
| 47 | Example 47 | 12,000 | 444 | 97.0 | 4.8 | 0.34 |
| 48 | Example 48 | 13,000 | 464 | 97.1 | 4.5 | 0.36 |
| 49 | Example 49 | 12,500 | 391 | 97.0 | 5.4 | 0.34 |
| 50 | Example 50 | 12,900 | 416 | 97.4 | 5.6 | 0.35 |
| 51 | Example 51 | 13,000 | 464 | 97.1 | 4.9 | 0.35 |
| 52 | Example 52 | 13,600 | 400 | 97.5 | 4.8 | 0.36 |
| 53 | Example 53 | 12,000 | 333 | 97.0 | 5.8 | 0.34 |
| 54 | Example 54 | 11,000 | 355 | 97.0 | 6.2 | 0.34 |
| 55 | Example 55 | 14,000 | 500 | 97.7 | 5.1 | 0.37 |
| 56 | Example 56 | 14,800 | 510 | 97.9 | 5.0 | 0.37 |
| 57 | Example 57 | 11,500 | 383 | 97.0 | 5.2 | 0.34 |
| 58 | Example 58 | 12,000 | 387 | 97.1 | 5.5 | 0.35 |
| 59 | Example 59 | 13,000 | 464 | 97.4 | 4.8 | 0.35 |
| 60 | Example 60 | 12,800 | 441 | 97.4 | 5.0 | 0.35 |
| 61 | Example 61 | 11,500 | 338 | 97.1 | 6.2 | 0.34 |
| 62 | Example 62 | 11,600 | 363 | 97.1 | 5.5 | 0.34 |
| 63 | Example 63 | 11,900 | 397 | 97.3 | 5.3 | 0.34 |
| 64 | Example 64 | 15,100 | 419 | 97.8 | 4.9 | 0.38 |
| 65 | Comparative Experiment 1 | 9700 | 323 | 95.2 | 7.8 | 0.33 |

APPLIED EXAMPLE 66

Polymerization of Ethylene

In a stainless steel autoclave having an inner volume of 1.5 liters and provided with a stirrer, 12.0 mg of the catalyst component obtained in Example 65, 0.7 mmol of triisobutyl aluminum, and 700 ml of isobutane were placed under a blanket of nitrogen gas. The polymerization system thus prepared was heated to 85° C. Then, hydrogen was introduced until the partial pressure of hydrogen reached 2 kg/cm² and ethylene was subsequently introduced until the partial pressure of ethylene reached 5 kg/cm². Polymerization of ethylene was carried out for 60 minutes while ethylene was continuously supplied to the polymerization system in such a manner as to keep the total pressure of the polymerization system constant. After completion of the polymerization, the solvent was removed from the polymerization system and the unaltered ethylene was purged to permit withdrawal of a white powdery polymer. The polymer was dried under a vacuum at 70° C. for ten hours. Consequently, there was obtained 224 g of polyethylene powder having an MI of 1.5 g/10 min. and a bulk density of 0.35 g/cm³ (Kc=18,700 and specific catalyst activity [amount of polymer, in g, formed per g of catalyst component, per hour of polymerization time, and per kg/cm² of partial pressure of ethylene]=3,740).

APPLIED EXAMPLE 67

Polymerization of ethylene was carried out by following the procedure of Applied Example 66, except using the catalyst component obtained by Comparative Experiment 2 in the pace of the catalyst component of Example 65. Consequently, there was obtained a polyethylene powder having an MI of 1.0 g/10 min. and a bulk density of 0.27 g/cm³ (Kc=9.800 and specific activity=1,960).

What is claimed is:

1. A process for the homopolymerization of an olefin or the copolymerization of an olefin with another olefin, said process comprising polymerizing the olefin(s) in the presence of a catalyst system comprising (A) a titanium-containing supported catalyst component comprising the product obtained by contacting (1) a reaction product of (a) a dihydrocarbyl magnesium compound, mixtures thereof or a complex with an organic compound of aluminum, boron, beryllium, or zinc, and (b) a chlorine-containing alcohol with (2) a di-, tri- or tetravalent titanium compound, and (B) an organo metallic compound of Groups I through III.

2. The process for the homopolymerization of an olefin or the copolymerization of an olefin with another olefin, said process comprising polymerizing the olefin(s) in the presence of a catalyst system comprising a titanium-containing supported catalyst component comprising the product obtained by contacting (1) a reaction product of (a) n-butylethyl magnesium, and (b) 2,2,2-trichloroethanol, with (c) di-n-butylphthalate, and (d) titanium tetrachloride, and (B) an organo metallic compound of Group I through III.

* * * * *